United States Patent
Grotto et al.

(10) Patent No.: US 9,930,255 B2
(45) Date of Patent: Mar. 27, 2018

(54) SYSTEM AND METHOD FOR SUPPLYING POWER TO SURVEILLANCE VIDEO CAMERAS AND PROTECTION CASES FOR SUCH VIDEO CAMERAS

(71) Applicant: VIDEOTEC S.P.A., Schio (VI) (IT)

(72) Inventors: Alessio Grotto, Schio (IT); Dario Zattara, Schio (IT)

(73) Assignee: VIDEOTEC S.P.A., Schio (VI) (IT)

( * ) Notice: Subject to any disclaimer, the term of this patent is extended or adjusted under 35 U.S.C. 154(b) by 204 days.

(21) Appl. No.: 14/430,887

(22) PCT Filed: Sep. 12, 2013

(86) PCT No.: PCT/IB2013/058505
§ 371 (c)(1),
(2) Date: Mar. 24, 2015

(87) PCT Pub. No.: WO2014/045171
PCT Pub. Date: Mar. 27, 2014

(65) Prior Publication Data
US 2015/0256747 A1    Sep. 10, 2015

(30) Foreign Application Priority Data
Sep. 24, 2012  (IT) .............................. MI2012A1590

(51) Int. Cl.
*H04N 5/232* (2006.01)
*H04N 7/18* (2006.01)
(Continued)

(52) U.S. Cl.
CPC ... *H04N 5/23241* (2013.01); *H04L 12/40045* (2013.01); *H04N 5/2252* (2013.01); *H04N 7/18* (2013.01)

(58) Field of Classification Search
USPC ........... 348/208.16, 333.13, 372; 307/24, 29, 307/31–41, 62; 713/300, 324, 340
See application file for complete search history.

(56) References Cited

U.S. PATENT DOCUMENTS

2006/0273661 A1* 12/2006 Toebes .................... G06F 1/266
307/106
2008/0052546 A1* 2/2008 Schindler ................ G06F 1/266
713/300
(Continued)

FOREIGN PATENT DOCUMENTS

| EP | 2026496 A1 | 2/2009 |
|---|---|---|
| JP | 2009-089258 A | 4/2009 |
| WO | 2011/116258 A1 | 9/2011 |

OTHER PUBLICATIONS

International Search Report in corresponding application dated Feb. 13, 2014.

*Primary Examiner* — Shahbaz Nazrul
(74) *Attorney, Agent, or Firm* — Florek & Endres PLLC

(57) ABSTRACT

The present invention relates to a power supply system for video cameras (2) and for protection cases (1) for video cameras. The system comprises a first device (13), called as powered device since it receives power from a remote device, able to split a supply voltage (131) and a data signal (130) from a power supply input line (18). A plurality of power supply lines (14a-14e) are connected to a first output of the powered device (13) and they supply a plurality of electric components (7,8,9,10) via the supply voltage (131) extracted by the powered device (13). The system further comprises a power supply equipment (19) connected to the powered device (13) so as to receive as input the supply voltage and the data signal split by the powered device. A case and a method for powering a video camera are also described.

14 Claims, 3 Drawing Sheets

(51) Int. Cl.
 *H04L 12/40* (2006.01)
 *H04N 5/225* (2006.01)

(56) References Cited

U.S. PATENT DOCUMENTS

| | | | | |
|---|---|---|---|---|
| 2008/0062586 A1* | 3/2008 | Apfel | ............... | H04L 12/10 361/18 |
| 2008/0214140 A1* | 9/2008 | Caveney | ............. | H04L 12/66 455/402 |
| 2012/0319468 A1* | 12/2012 | Schneider | .......... | H04N 7/185 307/1 |

* cited by examiner

SYSTEM AND METHOD FOR SUPPLYING POWER TO SURVEILLANCE VIDEO CAMERAS AND PROTECTION CASES FOR SUCH VIDEO CAMERAS

TECHNICAL FIELD

The present invention relates to the video surveillance field, and particularly to the field of cases for surveillance video cameras.

Particularly the present invention relates to a power supply system and method for a video camera and for the relevant protection case housing it.

PRIOR ART

In the video surveillance field it is known to install video cameras into protection cases intended to protect video cameras against atmospheric events and tampering actions.

Cases are usually provided with fans, heating elements and sensors necessary to maintain the temperature of the air inside the case within the operating range of the video camera, or to demist the transparent panel through which the video camera takes the images of the monitored environment.

Fans, heating elements and sensors need power that in many cases is transmitted through a dedicated line, separated from the data line on which the video signal of the video camera is transmitted.

In order to reduce installation time and costs, recently the use of POE (Power Over Ethernet) technology has been spreading in order to provide to the case, through the same network cable, both the power supply for the case components and the control data.

The European patent EP2026496 discloses a case wherein a POE splitter is housed which is able to split the power and data transmitted on an Ethernet cable. The splitter therefore is connected to a plate for providing the necessary power to a heating element and/or a fan.

Although it is operative, such solution has some drawbacks.

The POE standard (802.3af-2003) or POEplus standard (802.3at-2009) provide a maximum limit for the power that can be transferred on the ethernet cable from a PSE (Power Sourcing Equipment) power supply device to a powered one (so called Powered Device). In case of malfunction of a component, or of a sudden excessive request of power by several components of the case, the remote power supply equipment that provides the power to the splitter may stop the power supplying (such to avoid failures and malfunctions), therefore with the risk of stopping the surveillance service.

OBJECTS AND SUMMARY OF THE INVENTION

It is the object of the present invention to overcome the drawbacks of the prior art.

Particularly, it is the object of the present invention to control the electric energy consumptions of the components of a case.

These objects are achieved by a method and a system embodying the features of the annexed claims, which are an integral part of the present description.

The idea at the base of the present invention is a power supply system for video cameras and for protection cases for video cameras. The system comprises a first device, called as powered device, since it receives the power from a remote device, able to split a supply voltage and a data signal from an input power supply line. A plurality of power supply lines are connected to a first outlet of the powered device and they power a plurality of electric components by the supply voltage taken from the powered device. The system further comprises a power supply equipment connected to the powered device such to receive as input the supply voltage and the data signal separated by the powered device. The power supply equipment provides on an output line an output voltage and the data signal, and it informs a control circuit about the electric power requested on the output line, that is by the video camera connected to such line. The control circuit is operatively connected to the power supply lines of the components and it stops or reduces the power absorption from one or more power supply lines in case the electric power requested by the electric components and by the power supply equipment exceeds a predetermined value.

This power supply system allows the video camera and the components of the case to be powered by means of only one input line which is used for the data and the power supply. Advantageously, the system permits the communication with the video camera (which can be replaced in a case and can be of different types), such to know the absorption in order to control the several devices of the case in order to avoid an excessive power consumption, that, in addition to environmental aspects can cause the service to stop in systems wherein the remote device powering the case is configured for stopping the current supply when the case requests too much current.

In one embodiment, the system comprises a plurality of switches placed in series to the power supply lines of the electric components. These switches are controlled by the control circuit, which in turn is configured to open and close the switches such to stop power absorption by components connected to the power supply lines.

Since the switches can be made with low cost components, such as transistors or SCR (Silicon Controlled Rectifier), this solution is efficient and inexpensive in controlling the power of the case.

Preferably the power supply system further comprises a mode switch for setting a mode of operation of the power supply system. The mode switch is adapted to switch between a first and a second position to which different values of maximum power absorbable by the case are associated. The control circuit defines the maximum power value absorbable by the case depending on the position of the mode switch so that it stops or reduces power absorption by the electric components should the maximum power value associated to the position taken by said mode switch be exceeded.

This solution therefore allows a flexible case to be provided, able to operate in different video surveillance systems.

In one advantageous embodiment, well suited for POE and POEplus systems, the control circuit is configured to regulate the input impedance of the powered device based on the position of the mode switch. Since in POE and POEplus systems a power supply equipment provides to a powered device a power that depends on the input impedance the latter shows in a hand shaking phase, this solution is particularly advantageous.

Then advantageously the system comprises a surge protection circuit connected to the input line of the case.

Therefore the invention relates to a power supply system as described above, and to a case for surveillance video cameras comprising it.

The invention relates also to a power supply method for a case for video cameras and a relevant video camera. According to the method a supply voltage is received by an input line through which data are exchanged; by means of the supply voltage a plurality of components of the case are powered, in particular at least one fan and/or an heating element. The video camera is powered by the power taken from the input line too. The power supply to the video camera is provided on a output line through which the same video camera transmits a digital video signal, for example, but not exclusively, a POE or POEplus line. The power absorption of the components of the case is therefore controlled on the basis of the power absorbed by the video camera, such to keep the absorption within a predetermined value.

In one embodiment of the method, the control of the power absorption by the electric components is made by stopping the power supply of one or more components when the request of power by the components and the video camera exceeds a predetermined value.

As an alternative, or in combination with stopping the power supply line, it is possible to control the electric components such that they switch off or reduce the power absorption when the request of power by the components and the video camera exceeds a predetermined value.

Further characteristics, objects and advantages of the present invention will be more clear from the description.

BRIEF DESCRIPTION OF THE DRAWINGS

The invention will be described below with reference to non-limiting examples, provided by way of example and not as a limitation in the annexed drawings. These drawings show different aspects and embodiments of the present invention and, where appropriate, reference numerals showing like structures, components, materials and/or elements in different figures are denoted by like reference numerals.

DETAILED DESCRIPTION OF THE INVENTION

Figure 1:
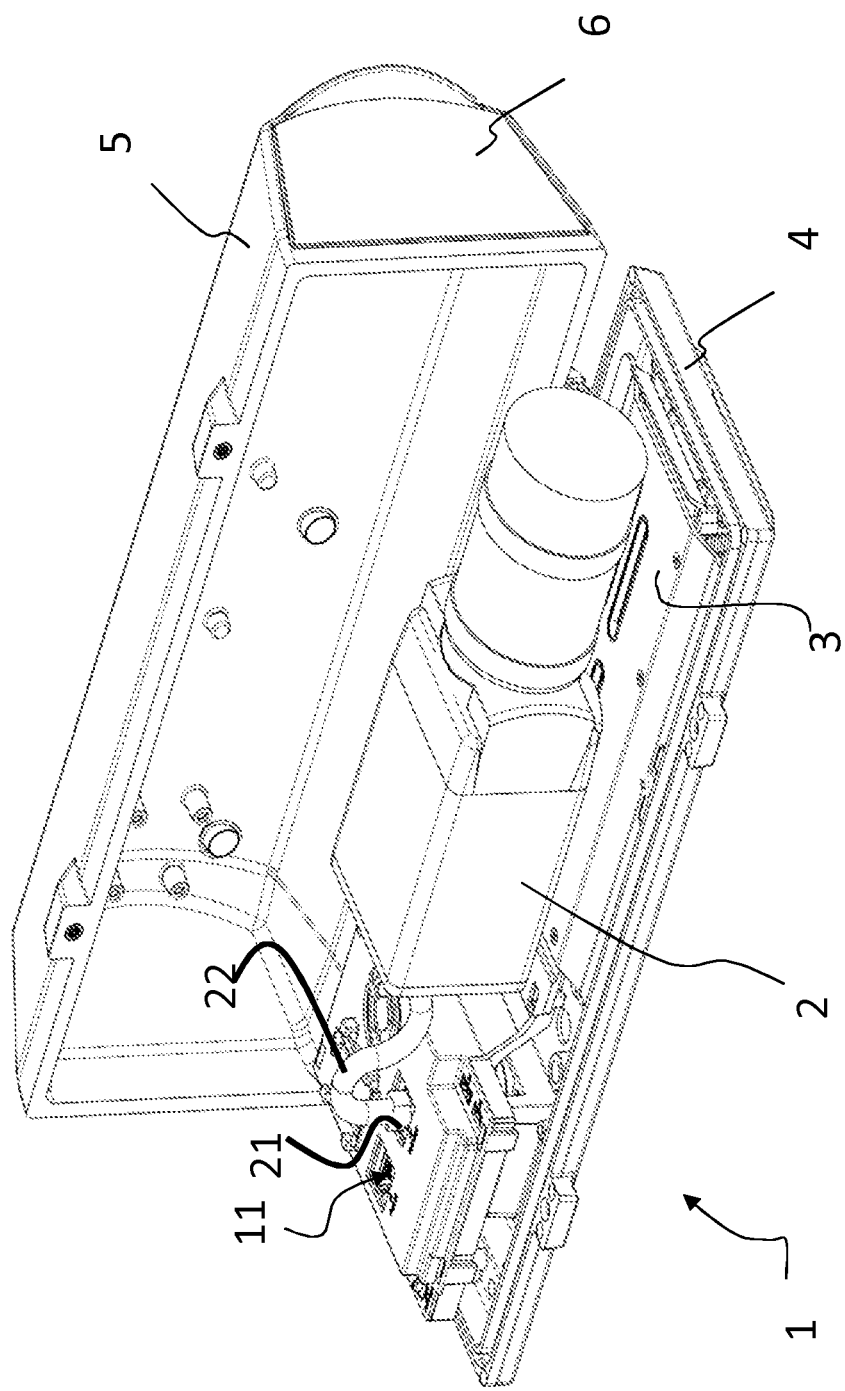
FIG. 1 is a perspective view of a case according to the invention in the opened condition, with a video camera housed therein.

While the invention is susceptible of various modifications and alternative forms, some preferred embodiments are shown in the drawings and will be described below in detail. It should be understood, however, that there is no intention to limit the invention to the specific embodiment disclosed, but, on the contrary, the intention of the invention is to cover all modifications, alternative forms, and equivalents falling within the scope of the invention as defined in the claims.

The use of "for example", "etc", "or" indicates non-exclusive alternatives without limitation unless otherwise defined. The use of "including" means "including, but not limited to," unless otherwise defined.

FIG. 1 shows a case 1 wherein a surveillance video camera 2 is housed which is suitably mounted on a support 3.

The case 1 in a known manner comprises a first 4 and a second 5 half-shell connectable to each other to define a volume housing at least one video camera 2. The half-shell 5 comprises a transparent front panel 6 that constitutes a window through which the video camera 2 can acquire images.

In a manner known per se, the case 1 comprises a plurality of components necessary to guarantee the proper operation of the video surveillance system, such as an air circulation fan 7, heating elements 8, a demisting system 9 (for example a system conveying the warm air towards the transparent panel of the case), additional heating elements 10 for heating the case, etc. . . . .

Figure 2:
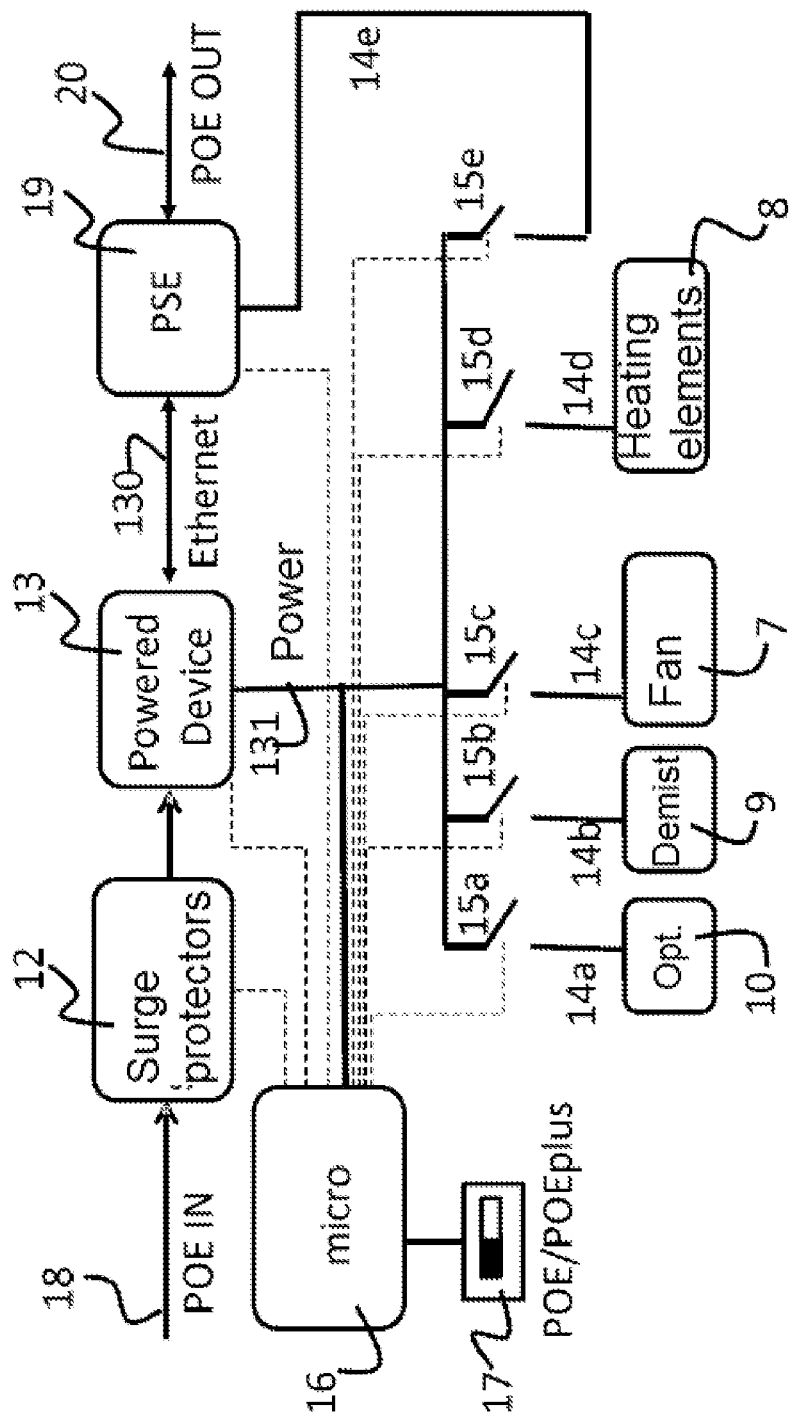
FIG. 2 is a block diagram of the onboard circuitry of the case of FIG. 1.
Figure 3:
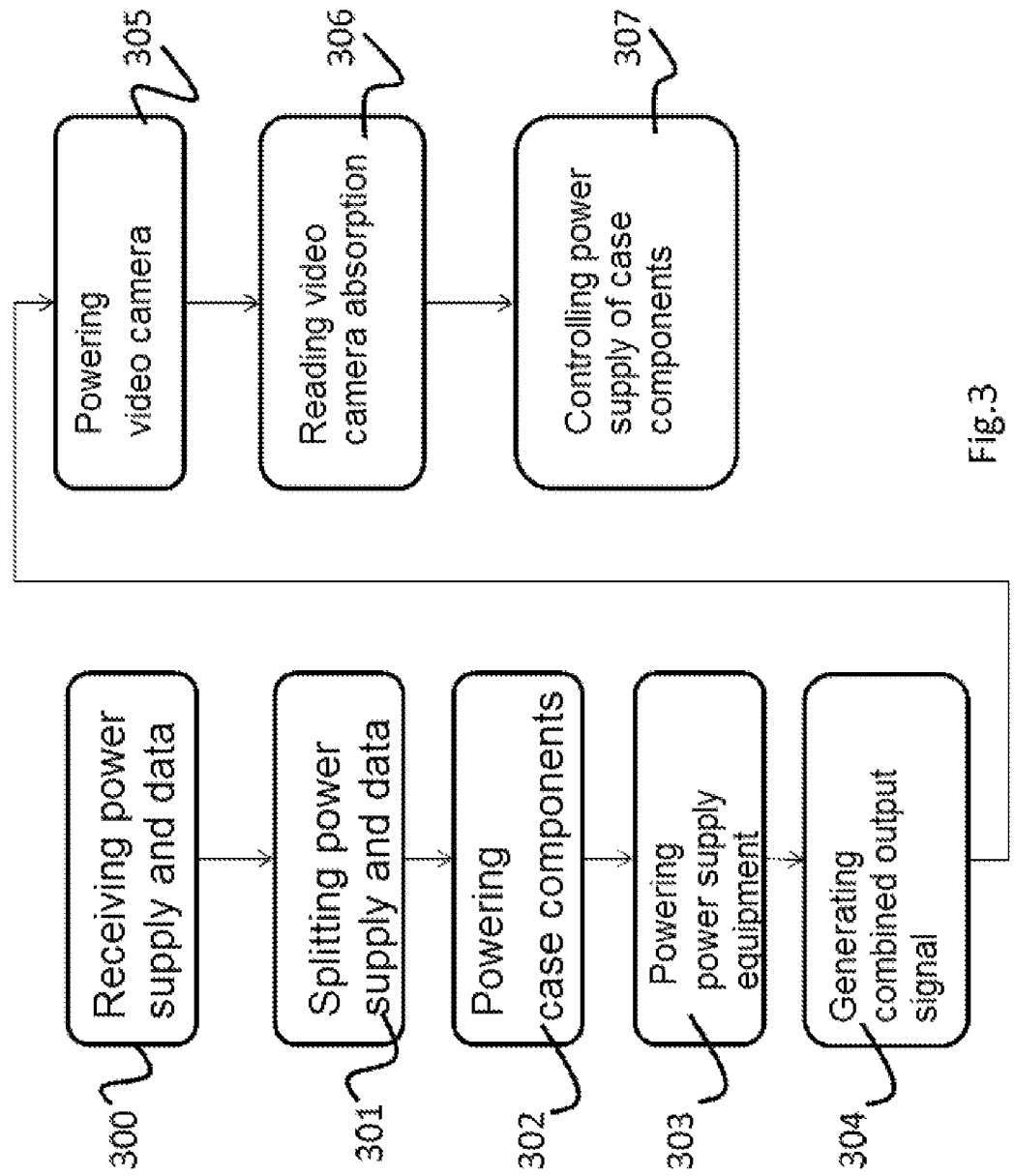
FIG. 3 is a flow chart of a method for controlling the power supply of a video surveillance video camera and of a case housing it.

FIG. 2 shows a block diagram of the onboard circuitry of the case 1; such block diagram particularly highlights the system for powering the components of the case, therefore it has not to be considered as a complete diagram of the components of the case. The circuitry and the power supply system of FIG. 2 allow a method for powering a surveillance video camera and a protection case for such video camera to be implemented, which is described below with reference to FIG. 3.

The case has an input connector 11 for the connection to a network cable, particularly a Ethernet cable, that is a four pair cable for transmitting data according to the Ethernet protocol, for example a FTP cable (Foiled Twisted Pair) or UTP cable (Unshielded Twisted Pair) or STP cable (Shielded Twisted Pair).

There are provided surge protectors 12 connected to the input connector, thus the circuitry within the case, and more important the video camera connected thereto are protected.

The case is adapted to operate with POE and POEplus signals, therefore downstream of the surge protectors 12 there is a powered device 13 that receives (300) as input both data and a supply voltage via the line 18. The powered device 13 splits (301) the data 130 from the supply voltage 131.

The powered device 13 is connected to the power supply lines 14a-14e of several components by switches 15a-15e controlled by a control circuit, that in the example described herein is composed of a micro-controller 16, but in different embodiments it can comprise one or more processors, SoC units (System On a Chip), wired logics, etc.

When the switch of a line is closed, the respective component is connected to the powered device 13 and it receives the current necessary to operate (302).

The micro-controller 16 controls the switches such to maintain the power absorbed by the whole circuitry under a predetermined limit value.

A mode switch, particularly a dip switch 17 allows a user to select the operating mode of the case, for example POE or POEplus.

Depending on the position of the switch, the micro-controller 16 controls the powered device 13 such that it has a suitable impedance on the input line 18, such impedance, according to POE and POEplus standards, being interpreted by the remote power supply equipment in order to understand how much power has to be supplied to the case. Obviously, other communication forms can be provided between the powered device 13 and the remote power supply equipment that supplies the power on the input line 18.

By setting the dip switch 17 the micro-controller 16 therefore knows how much power it can receive from the remote power supply equipment that supplies data and power on the input line 18. For example if the dip switch is set in POE position, the powered device 13 will ask to the remote power supply equipment to provide about 15.4 W, while if the dip switch is set in POEplus position, the powered device 13 will ask to the remote power supply equipment to provide up to 25.5 W.

In a preferred embodiment, the dip switch 17 determines the operating mode of the case, therefore if the latter is set on POEplus position, but the remote power supply equipment is not able to provide 25 W, then the latter stops the communication and the case is not able to operate. The anomaly is preferably signalled through leds of the case (for example powered by buffer batteries) or to a remote device before the power supply equipment ends the hand shaking phase with the case.

However it is possible to provide, as a variant, the powered device 13 to be able to accept the power conditions established by the remote power supply equipment and to accept to operate in POE mode instead of POEplus mode as provided by the dip switch 17. Thus the case would operate in a reduced mode only with a part of the available functions; advantageously it is possible to signal such operating anomaly through leds and light devices of the case or remotely.

A POE or POEplus power supply equipment 19, is powered (303) through one (14e) of the power supply lines derived from the powered device 13. The power supply equipment 19 is connected to the powered device 13 for receiving as input the data extracted by the powered device from the input line 18.

The power supply equipment 19 recombines (304) on an output line 20 the data extracted from the powered device 13 and a supply voltage taken from the line 14e. The power supply line 20 ends on an output connector 21 to which the video camera 2 is connected. Preferably the connector 21 is a RJ45 connector and it allows the video camera 2 to be connected by means of an Ethernet cable 22.

The power supply equipment 19 is an intelligent device, provided with a communication unit to communicate with other devices, and particularly with the micro-processor 16 on one side and with the video camera 2 (connected to the output of the power supply equipment through the line 20) on the other side.

Particularly, the power supply equipment 19 communicates with the video camera 2 both for receiving the digital video signal acquired by the video camera 2 and for exchanging information therewith about the available power and about the power requested by the video camera (306).

In one embodiment, the micro-controller 16 is configured such to know the average power absorption of each one of the components in the case. As an alternative or in combination to the configuration of the micro-controller 16 with the power consumptions of the components, the case can be provided with sensors for detecting the instantaneous power consumptions of the several components, thus the micro-controller 16 can know the power actually consumed. The sensors can be connected to or integrated in the micro-controller 16.

In the normal operation, the video camera 2 communicates to the power supply equipment 19 the power it needs for operating, such communication can be a precise communication or more simple it can be a maximum value of the requested power. In case of POE or POEplus systems, the video camera decides with the power supply equipment 19 the operating class and consequently the maximum power that the power supply equipment can supply thereto.

The power supply equipment 19 provides to the micro-controller 16 information about the power necessary for the video camera 2. Thus the micro-controller knows what are the power consumptions of each component of the case, included the video camera, and it decides (307) on which switches to act for stopping the power supply to one or more components such to keep the overall power consumption under a limit value set by the remote power supply equipment.

The choice of the components to be kept active, is decided by the micro-controller on the basis of the operating conditions of the case and on the basis of a priority order.

For example, with such temperature and moisture conditions to increase the risk of misting the transparent panel 6, the demisting system 9 has the prior with respect to heating elements 8, since if the transparent panel of the case is misted up, it is not possible to monitor the environment outside the case. Thus, if the video camera 2 requires a great amount of power, the micro-controller 16 will decide to disconnect the heating elements 8 while keeping the demisting system 9 in operation.

Similarly, in case of failure or short-circuit of one of the components, the micro-controller can decide to deactivate it, stopping the power supply, such to keep under control the overall power absorption inside the case. Preferably the failure can be signaled by means of light leds of the case, but as an alternative the micro-controller signals such failure to a remote device (for example a computer of a video surveillance system or to other cases of the same system) such to allow an operator to intervene or it possible such to allow other video cameras to cover the area currently monitored by the video camera of the damaged case, since due to the failure the video camera 2 may not operate anymore, for example because the panel of the case mists up and the demisting system is not operating anymore.

The solution described above therefore allows the provided objects to be achieved.

The case and its components are advantageously protected against overvoltage that may propagates into the case since the case is housed outside.

The micro-controller 16 guarantees to control the power inside the case and it is able to intervene on the several components by deactivating them depending on priority criteria that guarantee the proper operation of the video camera and the acquisition of a video signal adapted to the surveillance needs.

In use, the video camera 2 transmits a digital video signal on the output line 20, the digital video signal is received by the power supply equipment 20 and it is transmitted to the powered device 13. The communication line between the powered device 13 and the power supply equipment 19 is a bi-directional communication line, and the data are for example transmitted by the Ethernet protocol.

Considering the teaching received above, the person skilled in the art can now make several changes to the power management system and method described above, without for this reason departing from the scope of protection of the present invention as it results from the annexed claims.

The components described above with reference to circuit blocks can differently be joined, integrated or connected and the functions performed by them can be equivalently distributed on one or more blocks.

Even if the preferred embodiments have been described with reference to POE and POEplus standards for transmitting data and power on the same line, it is clear that the present invention can be used with other transmission protocols that provide to transmit data and power on the same line. For example, data and power can be transmitted by a power line communication system, in this case the powered device 13 and the power supply equipment 19 shall comprise a respective power line modem for receiving and transmitting the data.

Then it has to be noted that in the embodiment described above the microcontroller acts on power supply lines for disconnecting the components and for controlling the overall power consumption of the case.

As an alternative, however, the microcontroller can be connected to the several components by communication lines, for example a data bus, for performing more fine power regulations. For example the microcontroller 16 may communicate to the fan 7 to reduce the operating speed and therefore the consumptions or it may control the number of heating elements 8 that have to be activated.

Obviously not all the components can be provided with communication systems or can be configured for changing their operating mode as a response to signals received on suitable inputs. In one embodiment, the microcontroller will act therefore on some power supply lines of some components, and on the communication lines of other ones for controlling the overall power consumption.

The switches 15a-15e can be of the integrated type (for example MOSFET or SCR) or of the electromechanical type (e.g. relays).

The invention claimed is:

1. A power supply system for video cameras and for protection cases for video cameras, comprising
 a powered device able to split a supply voltage and a data signal from a power supply input line,
 a plurality of internal power supply lines connected to a first output of the powered device to power a plurality of electric components via said supply voltage,
 a power supply equipment connected to the powered device so as to receive as input the supply voltage and the data signal split by the powered device, the power supply equipment being able to supply on an output line an output voltage and the data signal,
 a control circuit operatively connected to said plurality of internal power supply lines and to said power supply equipment,
 wherein the power supply equipment is intended to inform the control circuit about the electric power requested on the output line, and wherein the control circuit is configured so as to stop or reduce power absorption from one or more of the internal power supply lines in case the electric power requested by the electric components and by the power supply equipment exceeds a predetermined value, said power supply system further comprising a mode switch for setting a mode of operation of the power supply system, the mode switch adapted to allow a user to manually switch between a first and a second position to which different maximum power values are associated, the control circuit being operatively connected to said mode switch and being configured to stop or reduce power absorption from one or more internal power supply lines in case the electric power requested by the electric components and by the power supply equipment exceeds the maximum power value associated to the position taken by said mode switch.

2. The power supply system according to claim 1, further comprising a plurality of switches placed in series to said internal power supply lines and controlled by said control circuit, wherein the control circuit is configured to open and close said switches so as to stop power absorption by components connected to said internal power supply lines.

3. The power supply system according to claim 1, wherein the control circuit is configured to regulate the input impedance of said powered device based on the position of the mode switch.

4. The power supply system according to claim 1, further comprising a surge protection circuit connected to said input line.

5. A case for surveillance video cameras, comprising
 a plurality of electric components, in particular at least one fan and an heating element,
 a support for a video camera,
 a power supply system comprising a powered device able to split a supply voltage and a data signal from a power supply input line,
 a plurality of internal supply lines connected to a first output of the powered device to power the plurality of electric components via said supply voltage,
 a power supply equipment connected to the powered device so as to receive as input the supply voltage and the data signal split by the powered device, the power supply equipment being able to supply on an output line an output voltage and the data signal, and
 a control circuit operatively connected to said plurality of internal power supply lines and to said power supply equipment,
 wherein the control circuit is operatively connected to said plurality of electric components via said plurality of internal power lines and is configured to command switch-off or reduction of electric consumptions in case the electric power requested by the electric components and by the power supply equipment exceeds a predetermined value, said case further comprising a mode switch for setting a mode of operation of the power supply system, the mode switch adapted to allow a user to manually switch between a first and a second position to which different maximum power values are associated, the control circuit being operatively connected to said mode switch and being configured to stop or reduce power absorption from one or more internal power supply lines in case the electric power requested by the electric components and by the power supply equipment exceeds the maximum power value associated to the position taken by said mode switch.

6. A method for powering a case for video cameras and a relevant video camera comprising
 receiving a supply voltage via a power supply input line,
 exchanging data through said power supply input line,
 powering a plurality of components of the case, in particular at least one fan and/or an heating element, by means of said supply voltage,
 powering the video camera by means of power taken from the input line, providing power supply to the video camera on an output line wherein the same video camera transmits a digital video signal, and by controlling power absorption of said components of the case based on the power absorbed by the video camera,
 providing a mode switch for setting a mode of operation of the power supply system, and
 using said mode switch to manually switch between a first and a second position to which different maximum power values are associated.

7. The method according to claim 6, further comprising stopping the power supply to one or more components of said plurality when the request of power by the components and the video camera exceeds a predetermined value.

8. The method according to claim 7, further comprising controlling said components in such a way that they switch off or reduce their power absorption when the request of power by the components and the video camera exceeds a predetermined value.

9. The method according to claim 7, wherein the predetermined value is settable by a user.

10. The case for surveillance video cameras according to claim 5, wherein the power supply system further comprises a plurality of switches placed in series to said internal power supply lines and controlled by said control circuit, wherein the control circuit is configured to open and close said switches so as to stop power absorption by components connected to said internal power supply lines.

11. The case for surveillance video cameras according to claim 10, wherein the control circuit is configured to regulate the input impedance of said powered device based on the position of the mode switch.

12. The power supply system according to claim 1, wherein said mode switch is a dip switch.

13. The case for surveillance video cameras according to claim 5, wherein said mode switch is a dip switch.

14. The method according to claim 6, wherein said mode switch is a dip switch.

* * * * *